US005238025A

United States Patent [19]

Preston

[11] Patent Number: 5,238,025

[45] Date of Patent: Aug. 24, 1993

[54] TWO VALVES AND A COMMON CONTROL THEREFOR

[76] Inventor: Richard W. Preston, Gordon Dr., Rockland Industrial Park, Rockland, Me. 04841

[21] Appl. No.: 845,682

[22] Filed: Mar. 4, 1992

[51] Int. Cl.[5] ........................ F15B 13/06; F16K 11/18

[52] U.S. Cl. .......................... 137/636.2; 74/471 X Y; 212/164; 251/248

[58] Field of Search ............................ 137/636, 636.2; 74/471 Y; 251/248; 212/164, 245; 91/522

[56] References Cited

U.S. PATENT DOCUMENTS

| | | | |
|---|---|---|---|
| 1,541,712 | 6/1925 | Horn | 137/636.2 |
| 2,521,646 | 9/1950 | Newcomer | 137/636.2 |
| 3,266,523 | 8/1966 | Stevens | 137/636.3 |
| 3,403,576 | 10/1968 | Ratliff | 74/471 |
| 3,437,112 | 4/1969 | Church | 137/636.2 |

*Primary Examiner*—Gerald A. Michalsky
*Attorney, Agent, or Firm*—Abbott Spear

[57] ABSTRACT

Valves and a common control therefor are disclosed in connection with an installation in a boat for use in hauling and servicing traps such as lobster traps. Such a boat has a line hauler and a davit provided with a snatch block and the davit is mounted to swing between positions in which the snatch block is located inboard above a washboard or with the snatch block outboard with the line to the trap trained over the snatch block and about the hauler. There are two valve controlled hydraulic circuits of which one controls the hauler and the other the davit. The control consists of a mount provided with a rotatable support which has a fixed fulcrum and slidably supports a shaft to which an operating handle is pivotally connected to the shaft so that by raising and lowering the handle the shaft is similarly moved and the shaft may be turned by swinging the handle relative to the support. The valves are connected to the shaft in a manner such that they may be independently operated, one only by raising and lowering the handle and the other by using it to turn the shaft.

7 Claims, 4 Drawing Sheets

TWO VALVES AND A COMMON CONTROL THEREFOR

BACKGROUND OF THE INVENTION

Lobster traps are visited on as regular a basis as weather permits with each trap then hauled, the catch removed and the trap rebaited before it is returned to the ocean bottom.

Boats used by commercial lobster fishermen are each equipped with a line hauler and a davit which is equipped with a snatch block and mounted at one side, adjacent a washboard where the traps are serviced. A valve controlled hydraulic system is provided to operate the line hauler at selected rates.

In hauling a trap, its line is caught below the buoy, trained over the snatch block and about the line hauler and the valve in control of the hydraulic system is then positioned to operate the line hauler at a wanted rate until the trap surfaces. The trap is then lifted at a slower rate until it is close to the snatch block and is then brought inboard manually and the line hauler operated to lower the trap onto the washboard while being manually guided. When the trap is ready to be returned to the ocean bottom, the trap is thrown overboard with the line released.

THE PRESENT INVENTION

The general objective of the present invention is to employ a second, valve controlled hydraulic system operable to swing the davit between outboard and inboard positions and to provide a common control for the valves thus enabling either or both valves to to be adjusted by the operator, simultaneously or in the alternative, using but one hand in either case.

This objective is attained by providing a mount having a rotatable support on which is mounted a fulcrum to which an operating handle is pivotally connected. A shaft is slidably held by the support with one end pivotally connected to the handle. One valve is connected to the shaft adjacent its other end to be operated by lowering and raising the handle. A second valve is also connected to the shaft adjacent that end in a manner such that it is operated by turning the handle relative to the mount thus to rotate the shaft. The adjustments of either valve are not affected by adjustments of the other valve.

Another aspect of the invention is that the connection between the second valve and the shaft is a parallel second shaft with the two shafts connected by meshing gears.

Another aspect of the invention is that both valves are of the spool type with the stem of one moveable axially as the shaft is raised and lowered and the other having its stem serving as the second shaft and moved axially as it is rotated by the shaft.

With both the line hauler and the davit operated by valve controlled hydraulic circuits and with the valves of both circuits operated by a common control, trap hauling operations are carried out with greater ease and convenience than has hitherto been possible. With the common control requiring the use of but one of the operator's hands, the other hand is free for such other uses as may be required while the two valves are in service.

Other objectives of the invention and the manner of their attainment will be apparent from the accompanying drawings and specification of the presently preferred embodiment of the invention and the claims.

BRIEF DESCRIPTION OF THE DRAWINGS

The accompanying drawings illustrate an embodiment of the invention for use in boats of commercial fishermen for lobsters and crabs

THE PREFERRED EMBODIMENT

Figure 1:
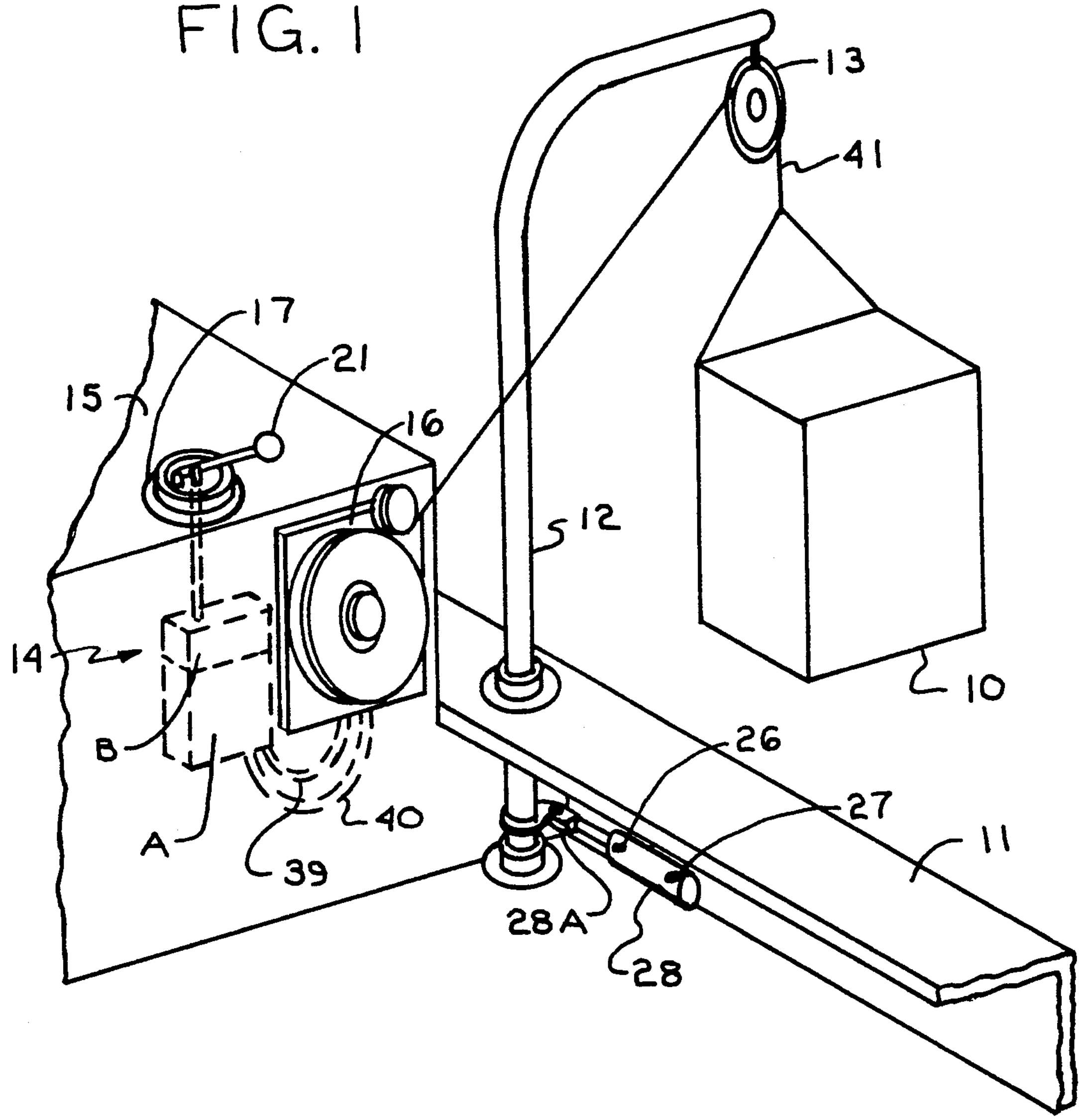
FIG. 1 is a schematic view illustrating a line hauler, a davit, the valve control and the washboard on which a hauled trap is to be serviced.
Figure 2:
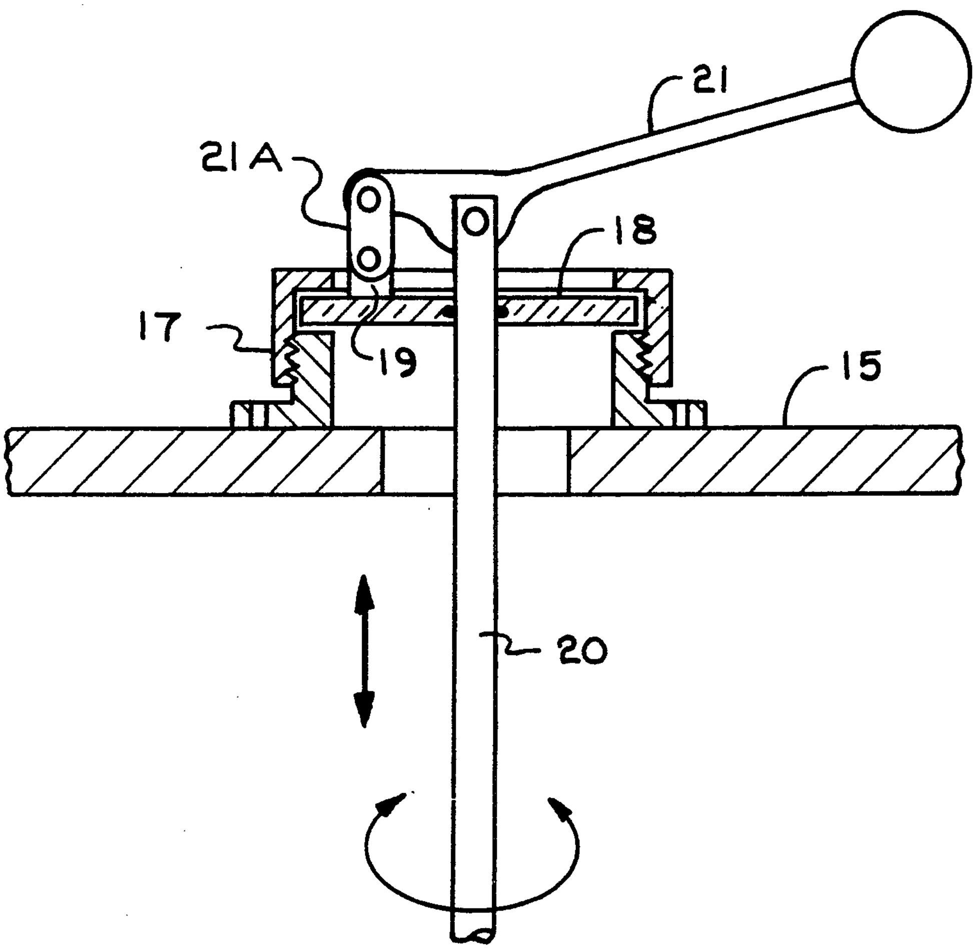
FIG. 2 is a partly sectioned side view of the upper portion of the control.

In FIG. 1, the washboard at one side of a lobster fisherman's boat on which a trap 10 is prepared for use and reuse, is generally indicated at 11. A davit, generally indicated at 12 is mounted to be swung between inboard and outboard positions so that its snatch block 13 may be positioned over the washboard 11 or swung outwardly for use in trap hauling, and a control in accordance with the invention and generally indicated at 14, is mounted on the bulkhead 15 close to the davit 12. A conventional hydraulically operated trap hauler, generally indicated at 16 is also mounted close to the davit 12. Such line haulers are manufactured by National Marine Hydraulics and Supply, Inc., Tenants Harbor, Me.

The control 14 has a mount 17 fixed on the bulkhead 15 and rotatably supporting a disc 18 which is provided with a fixed fulcrum 19 and which rotatably holds a shaft 20. An operating handle 21 is pivotally connected to the upper end of the shaft 20 and, through a link 21A, to the fulcrum 19.

Figure 3:
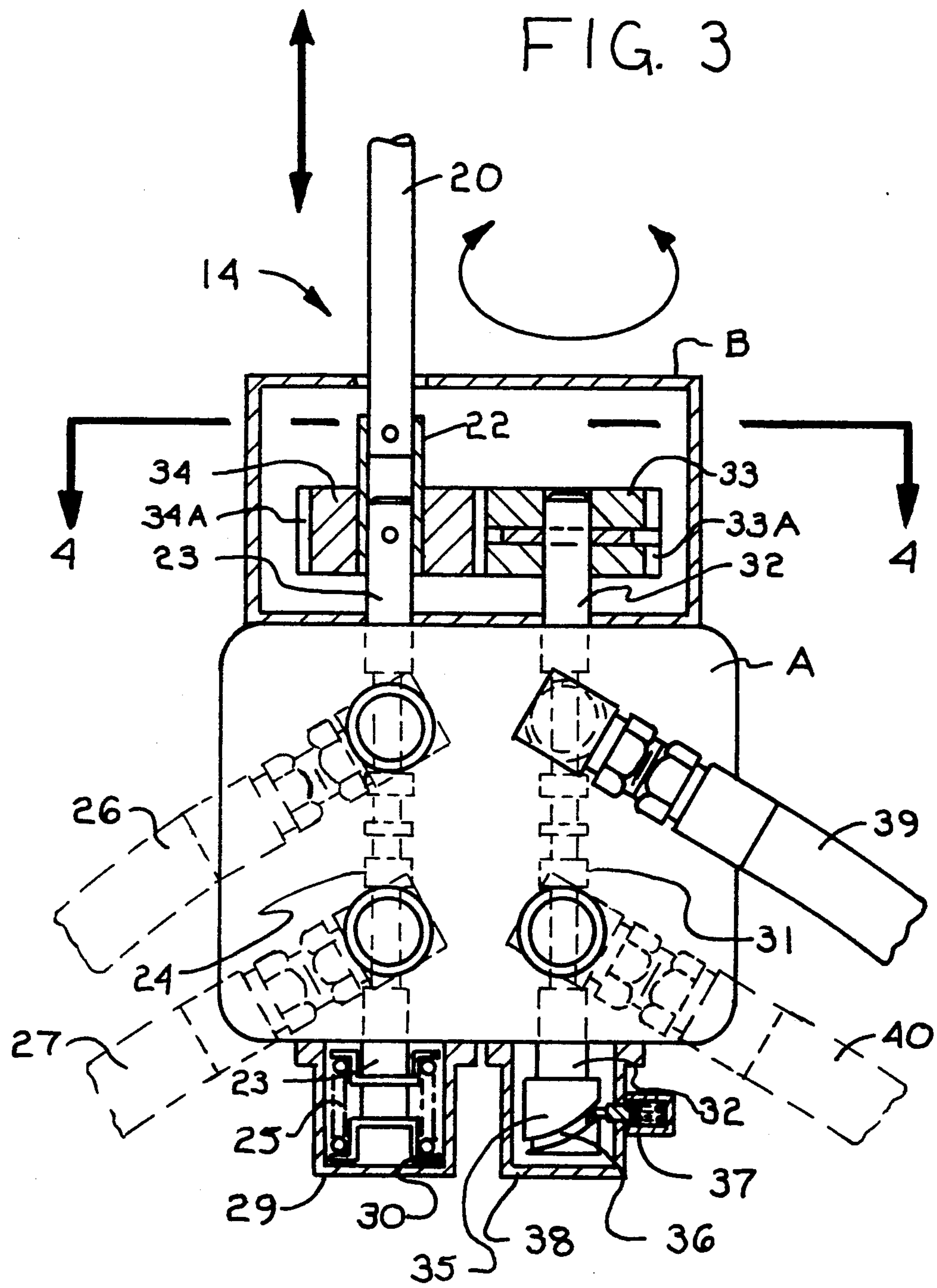
FIG. 3 is a like view of the lower portion of the control.
Figure 4:
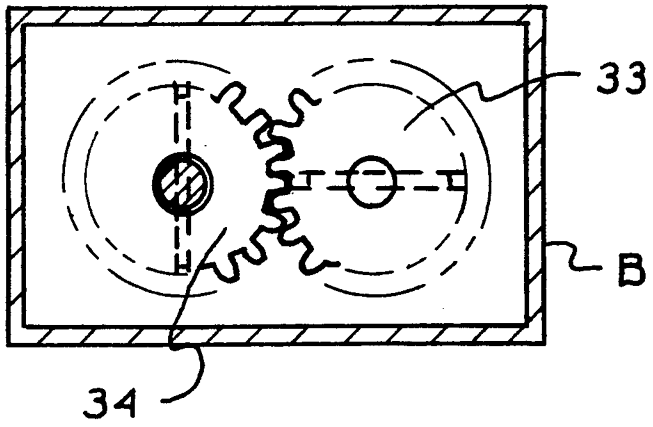
FIG. 4 is a section taken approximately along the indicated line 4—4 of FIG. 3.
Figure 5:
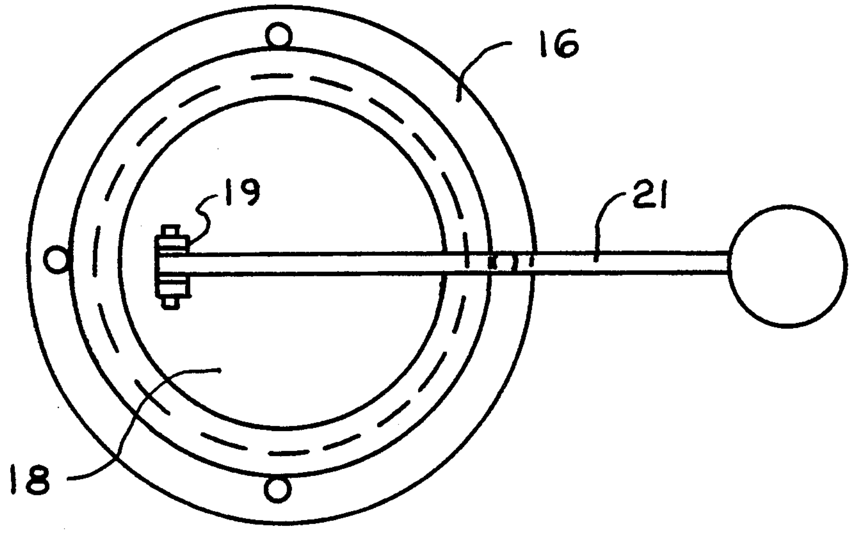
FIG. 5 is a top plan view of the upper portion of the control.

In FIG. 3, the shaft 20 is shown as extending downwardly into the bulkhead 15 and connected by a sleeve 22 to the stem 23 of a spool valve 24. The spool valve 24 is conventional and may be such as model No. V-15 (spring controlled) manufactured by Gresen Manufacturing Co. of Minneapolis, Minn. It will be appreciated that by lowering the free end of the handle 21, the stem 23 is lowered against the resistance of a spring 25 to permit flow through the conduits 26 and 27 of a conventional hydraulic piston-cylinder unit 28 the piston of which is connected to an arm 28A fixed on the lower end of the davit 12 and is operable to swing it between its two positions. The spring 25 is shown as within a cup 29 and connected to the stem 23 as at 30 to be tensioned as the handle is raised or lowered. The spring 25, unless so tensioned, holds the stem 23 in a neutral position.

The valve 31 is also a conventional spool valve and it may be such as model No. V-15 but is cam operated and also manufactured by Gresen Manufacturing Co. The stem 32 of the valve 31 has a gear 33 in mesh with a gear 34 fixed on the sleeve 22 with both gears having straight teeth 33A and 34A, respectively, whereby the gears remain in mesh as the shaft moves axially in operating the valve 24. It will be noted from FIG. 3 that the stem 32 has a block 35 on its bottom end which is formed with a cam track 36 entered by a fixed cam pin 37 held by the cap 38.

The valves 21 and 31 are shown as housed within a box A and the gears 33 and 34 are located within a box B with the boxes mounted within the bulkhead 15.

It will be seen from the foregoing that turning the handle 21 rotates the gears 33 and 34 with the turning of the cam block 35 causing the valve to open in proportion to the turning of the handle 21 and thus controls the flow through the conduits 39 and 40 of the hydraulic circuit to control the rate at which the line hauler drive 16 operates is controlled.

Assuming a trap 10 is to be hauled, the davit is held by its hydraulic system with its snatch block 13 inboard. The boat is maneuvered into a position in which the line 41 to the trap 10 can be caught by a hook close to the buoy, not shown by which the trap was located. The buoy and the line are pulled inwardly and the line 41 trained through the snatch block 13 and about the line hauler. The control 14 is so operated that the valve 31 becomes set to haul the trap 10 rapidly towards the boat until the trap 10 surfaces. The valve 31 is then reset to raise the trap slowly from the water until it is close to the snatch block 13 and in that position, the handle 21 is pushed downwardly causing the davit 12 to swing inwardly to position the hauled trap 10 inboard and over the washboard 11. The trap 10 is lowered by operating the control 14 by which the operation of the line hauler 15 is effected by the appropriate positioning of the valve 24. As the lines are typically connected to the traps adjacent one end, a hauled trap is held tilted and requires manual guidance as it is deposited on the washboard 15.

After a hauled trap has had its catch removed and has been rebaited, it may be pushed overboard to return to the ocean bottom with the valve 31 for the hauler set to permit it to turn freely.

I claim:

1. A control common to two valves having related functions, said control including a mount, a support rotatably held by the mount, a fulcrum fixed on the support, a shaft extending through and slidably held by the support with one end exposed, a handle pivotally connected to said one end and to the fulcrum, whereby the shaft can be lowered or raised by lowering and then raising the handle and also whereby the shaft can be turned by turning the support by swinging the handle laterally, both valves below the mount, means connecting the shaft to one valve in a manner such as to be operated only by the turning thereof and means connecting the shaft to the other valve in a manner such that it is operated only by vertical movements thereof.

2. The control of claim 1 in which each valve has an operating member, the operating members are parallel, and the means connecting the shaft to said one valve consists of a pair of meshing gears, each having straight teeth, one gear for each member and connected thereto, the gears dimensioned to remain in mesh as the shaft is moved axially to operate said other valve.

3. In combination, two hydraulic circuits each of which includes a valve and a device responsive to valve positions, each valve of the spool type and having an operating stem moveable axially thereof to effect operative and inoperative positions, and a control common to the two valves, said control including a mount, a support rotatably held by the mount, a fulcrum fixed on the support, a shaft extending through and slidably held thereby with one end exposed, a handle pivotally connected to said one end and the fulcrum, whereby the shaft can be raised or lowered by raising and lowering the handle and also the shaft can be turned by turning the support by swinging the handle laterally relative to the support, both valves below the mount, means connecting the shaft to the stem of the valve of one circuit in a manner such as to be operated only by the turning thereof and means connecting the shaft to the stem of the valve of the other circuit in a manner such that it is operated only by axial movements thereof.

4. The combination of claim 3 in which the valve stems are parallel and the means connecting the shaft to said one valve comprises a pair of gears having straight meshing teeth, one gear for each stem and connected thereto, the gears remaining in mesh during axial movements of the shaft in operating said other valve.

5. The combination of claim 4 in which one of the two hydraulic circuits is for use in operating a line hauler in a boat such as a boat for use in catching lobsters and crabs and the other circuit is for use in swinging a davit having a snatch block between inboard and outboard positions and the device of said one circuit operates the line hauler and the device of said other circuit is a piston-cylinder unit connected to the davit to effect the swinging thereof between said positions.

6. The combination of claim 5 in which the valve of said other circuit is closed when the davit is in the inboard position thereof.

7. The combination of claim 5 in which the valve of said one circuit is adjustable by the turning of its stem to vary the rate of rotation of the hauler.

* * * * *